United States Patent [19]

Matthews

[11] 3,999,932
[45] Dec. 28, 1976

[54] VALVE ASSEMBLY HAVING LEAK DETECTION APPARATUS

[75] Inventor: Russell Byron Matthews, Goshen, Ind.

[73] Assignee: Johnson Controls, Inc., Milwaukee, Wis.

[22] Filed: Nov. 10, 1975

[21] Appl. No.: 630,168

[52] U.S. Cl. .................................. 431/16; 431/22; 431/54; 137/66; 137/118
[51] Int. Cl.$^2$ .......................................... F23N 5/24
[58] Field of Search ............... 137/66, 118; 431/16, 431/22, 51, 53, 54

[56] References Cited
UNITED STATES PATENTS

2,297,854   10/1942   Alfery ................................. 431/54

Primary Examiner—Alan Cohan
Assistant Examiner—Gerald A. Michalsky
Attorney, Agent, or Firm—Johnson, Dienner, Emrich & Wagner

[57] ABSTRACT

A valve assembly including a gas valve having first and second redundant valve members which are individually operable to open and close respective inlet and outlet valve ports, and a pressure regulating apparatus interposed between the inlet and outlet valve ports operable to control gas flow to the outlet valve port when the first and second valve members are operated, and a leak detection apparatus for detecting a leak across one of the valve ports, including a pressure diaphragm operated valve which is maintained open responsive to gas flow through both the valve inlet port and the valve outlet port to permit gas flow to an outlet of the valve, the valve being operated to close in the event of gas flow for a predetermined time through only one of the ports indicative of a leak condition for the port. The valve assembly is disclosed with reference to an application in a fuel ignition system to control gas flow to a pilot burner and a main gas burner and to effect shut down of the system in the event of a leak condition for a pilot gas valve of the assembly.

16 Claims, 4 Drawing Figures

Fig. 4

VALVE ASSEMBLY HAVING LEAK DETECTION APPARATUS

BACKGROUND OF THE INVENTION

1. Field of the Invention

This invention relates to fluid flow valves, and more particularly, to a valve apparatus including first and second valve assemblies and a leak detection apparatus operable to detect a leak condition for one of the valve assemblies.

2. Description of the Prior Art.

In heating systems of the pilot ignition type, a pilot valve is energized in response to a request for heat, supplying pilot gas to a pilot outlet for ignition to establish a pilot flame. Once the pilot flame is proven, a main gas valve is operated to supply gas to a main burner apparatus for ignition by the pilot flame.

In such systems, conditions, such as the presence or absence of a flame at the pilot outlet, are frequently used to effect the sequencing operations provided by a control circuit of the system and to enable various checks to assure fail-safe operation of the system to prevent inadvertant operation of the valves. Thus, a leak condition for the pilot valve could interrupt the normal sequencing operations of the system as well as inhibiting certain of the checks which afford fail-safe operation of the system. Moreover, in the event the pilot valve is leaking, fuel will be continuously supplied to the pilot outlet, wasting fuel and producing a potentially hazardous condition.

Thus, it would be desirable to have a valve assembly which automatically responds to a leak condition for the fuel valve of the assembly and effects the shut down of the system to prevent operation of the valve for such condition.

SUMMARY OF THE INVENTION

It is, therefore, an object of the present invention to provide an apparatus for mechanically detecting a leak condition for a valve.

Another object of the invention is to provide an automatic fuel ignition system including a valve assembly which automatically responds to a leak condition for a fuel valve of the assembly to effect the shut down of the system in the event of such condition.

It is another object of the invention to provide a valve assembly for use in a fuel ignition system including a redundant pilot and main valves and which detects a leak condition for the pilot valve and prevents the operation of the main valve for such condition.

These and other objects are achieved by the present invention which has provided a valve assembly including an apparatus for mechanically detecting a leak condition for a valve means of the assembly and for effecting the deactivation of the system for such condition.

In accordance with a disclosed embodiment, the valve assembly has first and second redundant valve means disposed within the central body portion of the valve to control gas flow through a passageway interconnecting an inlet and an outlet of the valve. The first and second valve means comprise a first valve member disposed relative to a valve inlet port to open and close the valve inlet port, and a second valve member disposed relative to a valve outlet port to open and close the valve outlet port. The valve further includes a pressure regulator means disposed within the passageway and interposed between the valve inlet port and the valve outlet port for regulating the flow of fluid from the inlet port to the outlet port.

A gas flow control means is interposed between the valve inlet port and a utilization means for controlling gas flow to said utilization means. The gas flow control means comprises a housing having first and second chambers and a control valve which controls gas flow through said first chamber. The first chamber has an inlet communicating with the inlet port and an outlet communicating with an inlet of the control valve which has an outlet communicating with an inlet of the utilization means. The control valve has a valve member disposed to open and close a control port which is interposed between the inlet and the outlet of the control valve and valve actuator means operatively coupled to the valve member for normally maintaining said valve member in a flow-permitting position relative to said control port to permit gas flow through said first chamber and said control valve to said utilization means whenever said inlet port is open.

The second chamber has an inlet communicating with said outlet port to permit gas flow into said second chamber whenever said outlet port is open, to establish a pressure in said second chamber which operates on said valve actuator means to cause said valve actuator means to maintain said valve member in flow-permitting position relative to said control port. In the event the outlet port fails to be opened within a predetermined time following the flow of gas through said inlet port as may be caused by opening the inlet port or leakage across the inlet port, a pressure created within the first chamber operates on the valve actuator means, in the absence of a pressure in the second chamber, to cause said valve actuator means to move said valve member to flow-preventing position relative to said control port to thereby interrupt gas flow to said utilization means.

In accordance with a feature of the invention, a switch disposed within one of the chambers of the housing is operated by the valve actuator means, whenever the valve member is moved to a flow-preventing position, to energize a suitable alarm means to indicate such condition.

The valve assembly is described with reference to an application in a heating system to control the supply of fuel to a pilot burner and a main burner apparatus of the system. In such application, the first valve means is operable to supply fuel to the pilot burner over the gas flow control means and when the fuel is ignited at the pilot burner and proven, the second valve means is operated to supply fuel to the main burner apparatus for ignition by the pilot flame.

Under normal conditions, gas flow into the second chamber, when the second valve operates, creates a pressure within the second chamber which equalizes a pressure established with the first chamber when the first valve is operated, and thus the control valve is maintained open.

In the event of a leak condition for the first valve, gas flow into the first chamber creates a pressure in the first chamber which causes the control valve to close since in the absence of a request for heat the second valve does not operate and thus an equalizing pressure is not provided in the second chamber. Accordingly, on the next call for heat, gas flow to the pilot burner is interrupted since the control valve is closed, and the system will time out in a manner known in the art due to failure to produce a pilot flame within a given time out period.

DESCRIPTION OF A PREFERRED EMBODIMENT

Figures 1, 2, 3:
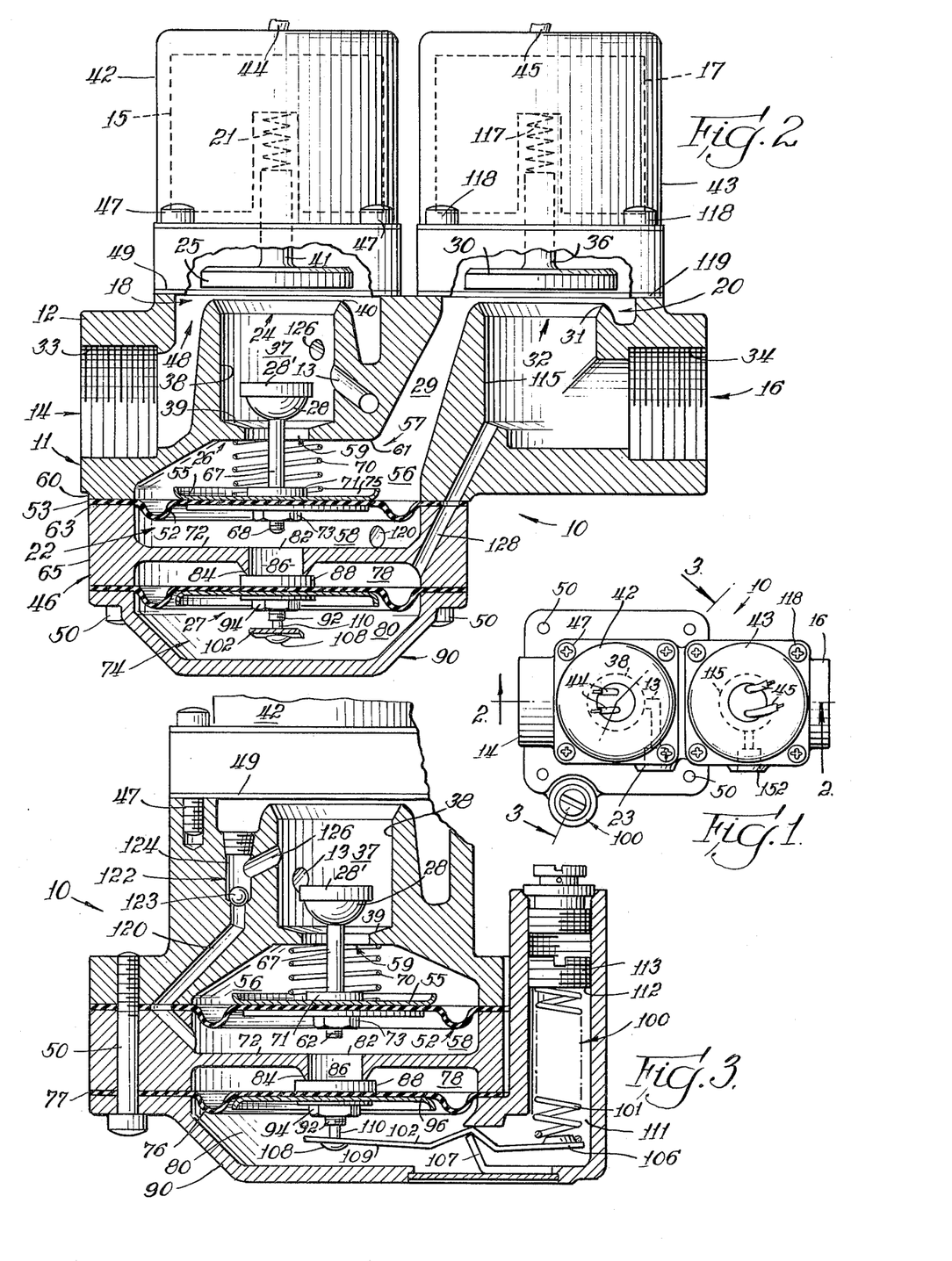
FIG. 1 is a top plan view of a fluid flow control valve used to illustrate the present invention.
FIG. 2 is a sectional view of the fluid flow control valve taken along lines 2—2 of FIG. 1.
FIG. 3 is a fragmentary sectional view of the fluid flow control valve taken along lines 3—3 of FIG. 1.
Figure 4:
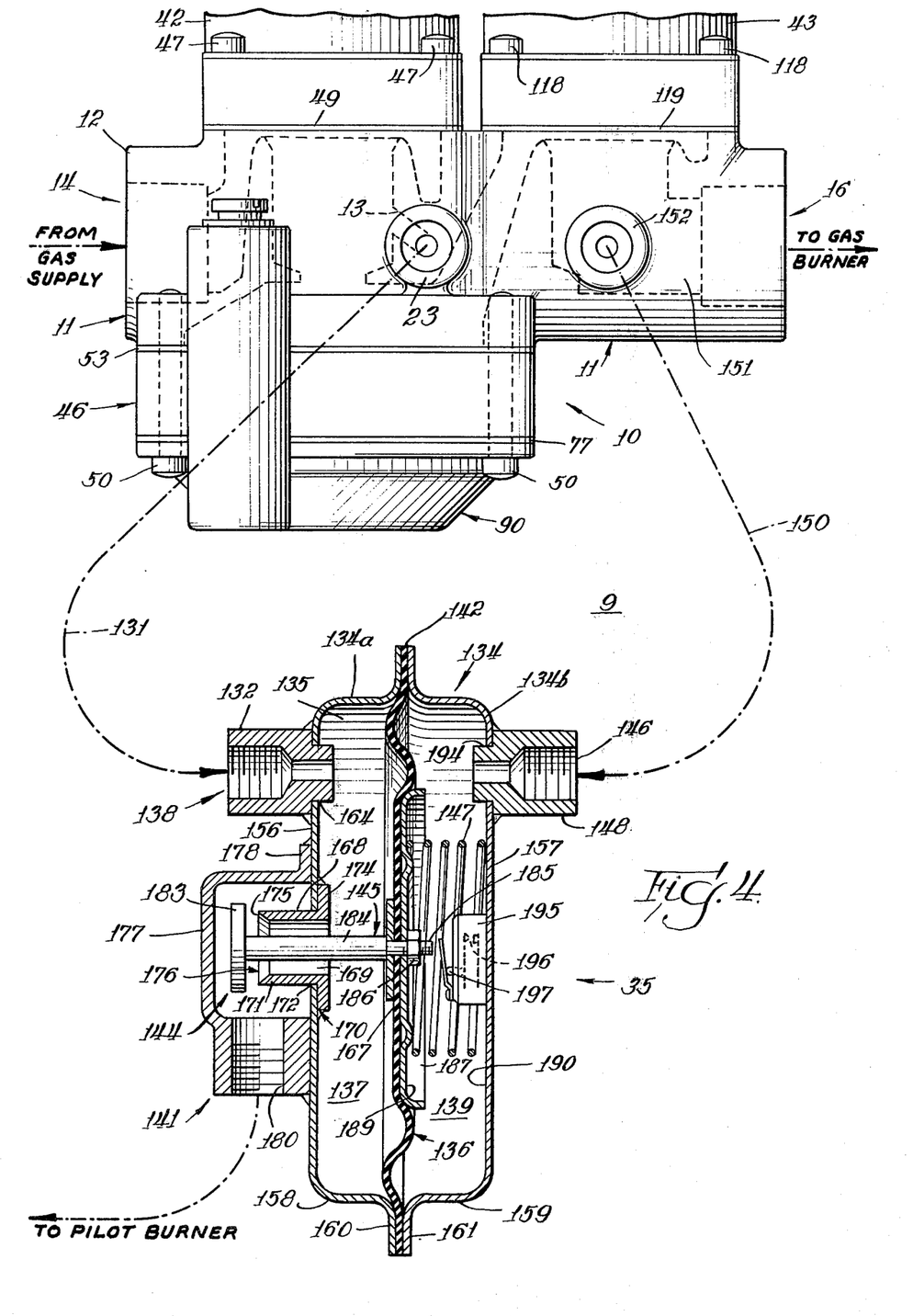
FIG. 4 illustrates a valve assembly including the valve shown in FIG. 2 and a leak detection apparatus, shown in a sectional view, of the present invention for detecting a leak condition for the valve.

Referring to the drawing, FIG. 2 is a partial sectional view taken along lines 2—2 of FIG. 1, of a fluid flow control valve 10 of a valve assembly 9, shown in FIG. 4, for use in illustrating the present invention. The valve 10 has a housing 11 including a main body portion 12 having an inlet 14 formed therein at the left hand side, and an outlet 16 formed therein at the right hand side. Redundant valve assemblies 18 and 20, and a pressure regulating apparatus 22, which are disposed within the valve housing 11, control the flow of fuel through the valve 10 from the inlet 14 to the outlet 16.

In accordance with the present invention, a leak detection apparatus 35 of the valve assembly 9, shown in FIG. 4, is employed with the valve 10, shown in the upper portion of FIG. 4, and is operable to detect a leak condition for valve assembly 18 and effect shut down of the system in a manner to be described in detail hereinafter.

By way of example, the valve assembly 9 is described with reference to an application in an automatic fuel ignition system of the pilot ignition type for supplying gaseous fuel to a pilot burner (not shown) and a main burner apparatus (not shown) of the system. Valve assembly 18, which is disposed adjacent the inlet 14 of the valve, controls the flow of fuel to the pilot burner apparatus, and valve assembly 20 which is disposed adjacent the outlet 16 of the valve 10, controls the flow of fuel to the main burner apparatus. The pilot gas or inlet valve assembly 18 includes a valve disc 25 which is lifted off valve seat 40 upon energization of the pilot valve solenoid 15, represented by the dotted lines in FIG. 2, to permit gas supplied to inlet 14 from a fuel supply to flow through inlet port 24 and via a passageway 13 formed in an inner wall 38 of the main valve body portion 12 to a suitable compression coupling 23 and over valve gas tubing, represented by the dashed line 131 in FIG. 4, and the leak detection assembly 35 to the pilot burner apparatus.

Following operation of the pilot valve 18, a regulating valve 26 of the regulating apparatus 22, including a regulator stud 28 carried by a pressure diaphragm 52, is operated to control the flow of gas through a regulator port 59 to an intermediate chamber 29 which serves as an inlet to the main gas or outlet valve assembly 20.

The main valve assembly 20 includes a valve disc 30 which is lifted off valve seat 31 upon energization of a main gas valve solenoid 17, represented by the dotted lines in FIG. 2, to permit gas to flow from the intermediate chamber 29 and outlet port 32 to the outlet 16 of the valve 10. The outlet 16 of the valve 10 is connected to the main burner apparatus.

The regulating apparatus 22 further includes a control valve assembly 27, including a valve disc member 88 carried by a diaphragm 76, which establishes the outlet pressure for the valve by providing a reference pressure for the pressure diaphragm 52 of regulating valve 26 in accordance with the setting of a manually adjustable bias assembly 100, shown in FIG. 3, including a compression spring 101 and a lever arm 102 which apply a bias to the diaphragm 76 to bias valve disc 88 into flow-preventing position relative to port 86. The control valve 27 is operable, when the main valve 20 is opened, to control the operation of the regulating valve 26 to initially supply gas to the outlet port 32 at low pressure and to gradually increase the outlet pressure to a desired value as determined by the force provided by the bias assembly 100.

Referring to FIG. 4, the leak detection assembly 35 comprises a housing 134 having a central cavity 135 in which extends a pressure diaphragm 136 dividing the cavity 135 into first and second pressure chambers 137 and 139. Pressure chamber 137 has an inlet 138 connected to the pilot outlet at compression coupling 132 and an outlet 141 connectable to the pilot burner. A valve 144, having a valve member 145 carried by the diaphragm 136, is interposed between the inlet 138 and the outlet 141 of the chamber 137. A compression spring 147 biases diaphragm 136 to normally maintain valve member 145 in flow-permitting position to permit gas to flow from valve inlet port 24 to the pilot burner through chamber 137. Gas flow into chamber 137 creates a pressure in chamber 137 creating a force on diaphragm 136, effecting operation of the valve 144 to a closed position.

Chamber 139 has an inlet 146 connected via compression coupling 148 and valve gas tubing 150 to an outlet of the valve outlet port 32 at compression coupling 152. Accordingly, whenever main gas valve 20 is operated to open port 32, gas flows into chamber 139 to equalize the pressure on diaphragm 136 provided by pilot gas to maintain the valve 144 open. In the event of a leak condition for the pilot valve 18, the pilot gas supplied to chamber 137 creates a pressure within chamber 137 which moves the diaphragm 136 to close the valve 144 and prevent the flow of gas to the pilot burner.

Referring to FIG. 1, the pilot valve solenoid 15 and the main valve solenoid 17 are contained within respective housings 42 and 43, which are disposed in side by side relationship on the upper portion of the main valve body 12 and are connectable via leads 44 and 45 to a suitable control circuit (not shown) operable to energize the pilot valve solenoid 15 to operate the pilot valve 18, permitting gas to be supplied to the pilot burner for ignition to establish a pilot flame. When the pilot gas has been ignited and the pilot flame proven, the control circuit energizes the main gas valve solenoid 17 to operate the main gas valve 20 to supply fuel to the main burner apparatus for ignition by the pilot flame.

Considering the valve 10 in more detail, with reference to FIG. 2, the main body portion 12 of the valve housing 11 has a threaded inlet portion 33 to facilitate connection to a gas source, and a threaded outlet portion 34 to facilitate connection to the main burner apparatus. A cylindrical inner vertical wall 38 and a horizontal wall portion 39 of the main body portion 12 define a chamber 37 and an upwardly extending knife-edge 40 of the vertical wall 38 forms a circular opening which defines the inlet port 24 at the upper end of the chamber 37. Valve disc 25 of pilot valve 18 is provided to open the valve inlet 14 to the inlet port 24 via passageway 48. The valve disc 25 is carried by a plunger 41 and is lifted off the port 24 upon actuation of the pilot valve solenoid 15 which is located within housing 42 which is shown partially cut away in FIG. 2 to illustrate the valve disc 25 and plunger 41. The housing 42 is mounted on the main body portion 12 by suitable screws 47. A gasket 49, disposed between the housing 42 and the main body portion 12, provides a fluid tight seal between the housing 42 and the valve body 12. A suitable bias element, such as a compression spring 21, normally urges the valve disc 25 into engagement with valve seat 40 such that valve 18 is normally closed when the solenoid 15 is deenergized.

The passageway 13, which serves as a pilot outlet, extends through the inner wall 38 of body portion 12 to the outside of the valve housing 11 at compression coupling 23 (FIG. 1) which permits connection to the pilot burner apparatus over a suitable gas valve tubing, represented by the dashed line 131 in FIG. 4. The pilot outlet is taken out between valve seat 40 and regulator port 59 to keep the pilot flame from being sucked out when the main gas port 32 is opened.

The valve housing 11 further includes a regulator body portion 46 and an associated cover portion 90 which are secured to the main body portion 12 by screws 50. A recessed horizontal wall 72 of the regulator body portion 46, and the lower surface 61 of horizontal wall 39 of the main body portion 12 define a central cavity 57 for the housing 11, in which is disposed the regulating valve assembly 26.

The regulating valve assembly 26 includes pressure diaphragm 52 and a regulator spud 28 which is carried by the diaphragm 52 and is provided to open and close a regulator port 59, which is defined by a beveled aperture formed in the horizontal wall 39 of main body portion 12. The diaphragm 52 has its marginal edge 53 sandwiched between the lower edge 60 of the outer wall of the main body 12 and the upper edge 63 of the outer wall 65 of the regulator housing 46 in an outstretched condition to divide the central cavity 57 into upper and lower chambers 56 and 58, respectively. The diaphragm is clamped between the main body portion 12 and the regulator portion 46 by screws 50 which extend through apertures in the marginal edge of the diaphragm 52. Sealing means, such as gaskets (not shown), may be installed on opposite marginal edges of the diaphragm 52 to provide a fluidtight seal.

A shaft 67 of the regulator spud 28 extends through the aperture 59 and carries a valve member 28' at one end thereof, which is adapted to seat in the aperture 59 to close the regulator port. The lower end of the shaft 67 is secured to the diaphragm 52 by a suitable mounting means which may comprise externally threaded stud portion 68 of the shaft 67 extending through suitable apertures in the diaphragm 52 and a backup plate, or reinforcing member 55, overlying the diaphragm 52. The diaphragm 52 and backup plate 55 are clamped between a flange 71 of the spud 28 and a nut 73 threaded on the stud portion 68. The backup plate 55 serves as a stiffening member for the diaphragm 52 and also defines the effective area of the diaphragm 52 as is well known in the art. A compression spring 70, which is disposed between the lower surface 61 of horizontal wall 39 and the upper surface 75 of the backup plate 55, biases regulator spud 28 to a flow-preventing position relative to the valve seat 59.

For the purpose of permitting regulator stud 28 to be lifted off regulator port 59, a passageway 120, best seen in FIG. 3, is formed in the outer wall of the main body portion 12 to permit the flow of gas from the inlet port 24 to the lower chamber 58 of the central cavity 57 when the pilot valve 18 is operated. A ball-check valve 122, including a ball member 123 is disposed within an enlarged portion 124 of the passageway 120 to permit limited flow of gas past the ball member 123 into chamber 58 and thereby control the opening rate of regulator spud 28. Also, upon deenergization of the pilot solenoid 15 which permits the pilot valve 18 to close, the ball-check valve 122 operates to dump gas contained within chamber 58 into chamber 37, as the ball 123 is moved past opening 126, to permit the gas flow through the passageway 13, thereby reducing the pressure within chamber 58 and permitting regulator stud 28 to be moved to a flow-preventing position relative to regulator port 59.

The lower surface of the horizontal wall 72 of body portion 46 and the cover member 90 define a lower cavity 74 which contains the control valve assembly 27. A pressure diaphragm 76 extending within cavity 74 divides the cavity 74 into two chambers 78 and 80.

The diaphragm 76 has its marginal edge 77 sandwiched between the body portion 46 and the cover portion 90. Suitable gaskets may be provided between the upper and lower marginal edges of the diaphragm 76 to provide a fluid tight seal between the cover 90 and the body portion 46.

Referring to FIG. 3, the horizontal wall portion 72 has a central aperture 82 having a downwardly extending knife-edge 84 which defines a control port 86. The valve disc 88 which is carried by diaphragm 76, is provided to open and close the port 86. The valve disc 88 is secured to the diaphragm 76 by way of a threaded push rod 92 and a nut 94. A backup plate 96 is interposed between the nut 92 and the diaphragm 76. Valve disc 88 is biased to the closed position by way of an actuator spring assembly 100, which is also operable to control the force on the diaphragm 76. The assembly 100 includes lever arm 102 which extends generally horizontally within the lower chamber 80, and an adjustment apparatus, including compression spring 101, which applies a force to one end 106 of the lever arm 102 which is transmitted via a pivot 107 to the other end 109 of the lever arm 102, which has a dimple 108 which receives the lower end 110 of threaded shaft 92. The spring 101 is disposed within a chamber 111 within a extension of the cover 90, and is compressed between the lower edge 112 of an adjustment screw 113 and end 106 of the lever arm 101. Adjustment screw 113, which is received in a threaded opening of chamber 111, is adjustable to vary the force applied to valve disc 88 and thus the pressure required to open the port 86.

Referring again to FIG. 2, considering the main valve assembly 20, a vertically extending inner wall 115 of the valve body 12 has an upwardly extending generally circular projection defining a knife-edge 31 which defines the outlet port 32. The valve disc 30, which is normally biased to a closed position by compression spring 117, is connected to valve stem 36 which extends within the main valve solenoid 17 which is housed within housing 43. Housing 43 is secured to the valve housing 11 by screws 118 and gasket 119 which provide a liquid tight seal. The solenoid 17 is operable to provide vertical movement for the shaft 36 to lift the valve disc 30 off the outlet port 32 to permit gas to flow from the intermediate chamber 29 over the outlet port 32 to the outlet 16 of the valve 10.

A passageway 128 extends through the main body portion 12 and regulator body portion 46 from the outlet 32 to chamber 78 to supply a control pressure to diaphragm 76, whenever valve 20 is operated, permitting the control port 86 to be opened, varying the pressure in lower chamber 58, beneath diaphragm 52 of the regulator valve assembly 26. Accordingly, an increase in the outlet pressure relative to the pressure value established by bias spring 101 causes a decrease in the pressure in chamber 58 resulting in downward movement of diaphragm 52 and thus regulator spud 28, decreasing the flow of gas to the outlet port 32. Conversely a decrease in outlet pressure effects an increase in the pressure in chamber 58 resulting in upward movement of regulator spud 28, increasing the flow of gas to the outlet port 32.

To permit gas to flow from main gas port 32 to the leak detection apparatus 35, a further gas outlet from the main gas port 32, provided through the forward wall portion 151 of the housing 11 (FIG. 4), terminates in a compression coupling 152 to facilitate connection to inlet 146 of the leak detection apparatus 35 via gas valve tubing, represented by the dashed line 150 in FIG. 4, and coupling member 148 at the inlet 146 of the leak detection apparatus 35.

Considering the leak detection apparatus 35, shown in FIG. 4, the housing 134 has first and second sections 134a and 134b, generally cylindrical in cross-section, having respective vertically oriented base portions 156 and 157 from which extend wall portions 158 and 159, the ends of which are bent over forming mating flanges 160, 161 when the housing is assembled. The marginal edge 142 of the pressure diaphragm 136 is sandwiched between flanges 160 and 161, and the diaphragm 136 divides a center cavity 135 of the housing 134, formed by the two housing sections 134a and 134b into pressure chambers 137 and 139. Suitable gaskets (not shown) may be employed to provide a fluid-tight seal between housing sections 134a and 134b.

The pilot gas flows through the pressure chamber 137 whenever the pilot valve 18 is operated, and gas provided over main valve port 32 flows into chamber 139 whenever the main valve 20 is operated. The base portion 156 of housing section 134a has an aperture 164 in which is received the inlet coupling member 132. A valve seat assembly 170 includes an open-ended cylindrical valve seat member 168 having a horizontal wall portion 171 extending through an aperture 172 in the base portion 156, which defines an outlet for the first chamber 137, and extending outwardly therefrom defining a knife-edge portion 175 which defines a valve port 176. The valve seat assembly 170 is secured to the base portion 156 adjacent aperture 172 by a flange 174 which extends vertically from the horizontal wall portion 171. The open end 169 of valve seat member 168 defines an inlet for the control valve 144.

A valve cover 177, which encloses the valve seat assembly 170, has a flange 178 which facilitates connection to the wall 156 of housing 134. A threaded outlet 180, formed in the valve cover 177 permits connection to the pilot burner.

The valve member 145 which is provided to open and close port 176 includes a valve disc 183 carried by a push rod 184 which is secured to the center portion 167 of the diaphragm 136 by way of a threaded shank portion 185 of the push rod 184, which extends through suitable apertures in the diaphragm 136 and a backup plate 187 and a nut 186 which is threaded onto the shank 185.

The compression spring 147, which biases the diaphragm 136 to normally maintain the valve disc 183 in flow-permitting position relative to port 176, is disposed between the inner surface 190 of wall 157 and the upper surface 189 of the backup plate 187.

The compression coupling 148, which facilitates connection to the valve port 32 is received in aperture 194 formed in wall 157 of housing portion 134b. It is pointed out, the coupling members 132 and 148, and the valve assembly cover 177 are each secured to the housing 134 in suitable manner to provide a fluid-tight seal.

An electrical switch 195 located within chamber 139 is operable by the push rod 184 to energize a suitable alarm device or to interrupt the thermostat control circuit in the event the push rod 184 is moved to close the valve port 176. The switch 195 has contacts 196, shown as being normally open, connectable to an alarm device or to the control circuit over conductors (not shown) which are extended through the housing 134 via a fluid tight compartment in a manner known in the art, and an actuator rod 197, which is disposed adjacent the threaded shank portion 185 of the push rod 184 to be moved to close the contacts 196 to interrupt the thermostat circuit and/or sound an alarm.

OPERATION

For the purpose of illustrating the operation of the valve assembly 9, including the leak detection apparatus 35, it is assumed that the pilot valve assembly 18 is functioning properly and that there is no leakage across valve seat 40 from the inlet 14 of the valve 10 to the pilot port 24.

Referring to FIG. 2, in response to a request for heat, as detected by a thermostat, for example, the pilot valve solenoid 15 is energized causing the valve disc 25 to be lifted off the valve seat 40, permitting gas supplied to the inlet 14 from a gas source to flow through the inlet port 24 to chamber 37 and, thus out of the passageway 13 over gas valve tubing 131 into chamber 137 of the leak detection apparatus 35 (FIG. 4), and over outlet 141 of the leak detection apparatus 35 to the pilot burner apparatus for ignition to establish a pilot flame.

Referring to FIG. 4, the gas flowing into pressure chamber 137 creates a pressure on diaphragm 136 which is sufficient to move the center of the diaphragm 136 against the force of compression spring 147, moving the valve member 145 toward flow preventing position relative to port 176. The size of the chamber 137 and the amount of travel of valve disc 183 determine the amount of time available for ignition of the pilot gas before main valve 20 has to be energized to prevent lock out of the system. In normal operation, the main valve 20 operates to supply gas to chamber 139, equalizing the pressure in chamber 137 and maintaining valve 144 open.

The gas also flows past ball-check valve 122 (FIG. 3) and through passage 120 into chamber 58 below diaphragm 52. Since the main gas valve 20 is closed, the chamber 56 above diaphragm 52 is sealed, enabling the gas flow through the inlet port 24 and passageway 120 to create a pressure within chamber 58 which operates on diaphragm 52 to move the regulator spud 28 a very small amount vertically off the regulator port 59, enabling a small amount of gas to flow into chamber 56 above diaphragm 52. The pressure above diaphragm 52 equalizes with the pressure below the diaphragm 52 as long as the main gas valve 20 is closed.

As soon as the pilot flame is established, the main valve solenoid 17 is energized, causing valve disc 30 to be lifted off valve seat 31, permitting gas to flow through outlet port 32 and to the main burner.

Gas also flows from port 32 to the inlet of the pressure chamber 139, and as the pressure builds up, the pressure within chamber 139 and the force of compression spring 147 equalizes the pressure in chamber 137 to maintain the valve 144 open.

When the main gas valve 20 operates, the pressure within chamber 56 above diaphragm 52 decreases as gas from chamber 56 flows through outlet port 32 to the outlet 16 of the gas valve 10. Accordingly, gas flow across the ball-check valve 122 and into chamber 58 increases the pressure in chamber 58 thereby causing diaphragm 52 to move regulator spud 28 further off the regulator port 59, increasing the flow of gas over the main valve port 32 to the outlet 16 of the valve 10.

The ball-check valve 122 limits the flow of gas past the ball 123 into passageway 120 and chamber 58, thereby controlling the opening rate of regulator spud 28, and the flow of gas to the main burner. The time for regulator valve 26 to open sufficiently to provide system pressure to the outlet 16 of the gas valve 10 may, for example, be approximately 8 seconds.

The main burner lights softly without rollout at the initial low pressure, and the flow increases as the regulator spud 28 moves away from the regulator port 59. The distance that regulator spud moves away from regulator port 59 is a function of the pressure in chamber 58 below the diaphragm 52. The pressure in chamber 58 is controlled by the control valve 27 and is a function of the bias apparatus 100 which supplies a bias to diaphragm 76 to control the positioning of control valve disc 88 relative to control port 86.

Referring to FIG. 2, when valve disc 30 of the main gas valve is lifted off the outlet port 32, gas flows through passageway 128 to chamber 78, which is above diaphragm 76, increasing the pressure within chamber 78 causing diaphragm 76 to move downwardly, moving valve 88 off port 86 just enough to bleed off gas from chamber 58, to decrease the pressure in chamber 58 controlling the position of the regulator spud 28 to hold the outlet pressure at a desired value, as determined by the force of bias member 100. The regulating function continues unit the outlet pressure corresponds to a desired pressure, typically the inlet pressure.

When the desired outlet pressure is reached at the outlet 16 of the valve 10, regulator action is provided as follows. In the event of an increase in the inlet pressure, a corresponding pressure is eventually obtained at the outlet 16, causing an increase in the amount of gas which flows through passageway 128 to chamber 58. Accordingly, diaphragm 76 is moved downwardly, moving valve disc 88 away from port 86, decreasing the pressure in chamber 58 and permitting the regulator spud 28 to move toward a flow preventing position relative to regulator post 58, to compensate for the increase in inlet pressure.

Similarly, a decrease in the inlet pressure results in a decrease in the amount of gas supplied through passageway 128 to chamber 78, permitting diaphragm 76 to move disc member 88 toward a flow preventing position relative to port 86 just enough to increase the pressure in chamber 58 to set regulator spud 28 a greater distance from regulator port 59, increasing gas flow through regulator port 59 to compensate for the change.

As indicated above, the main burner gas flows through the pilot port 24 and the main port 32 to provide redundancy. Thus, whenever the pilot valve 18 is closed, the supply of gas to the main valve is interrupted. Whenever the pilot valve 18 operates to close the inlet port 24, the ball-check valve 122 dumps the gas in chamber 58 to the pilot outlet 13, decreasing the pressure in chamber 58 permitting regulator spud 28 to be moved down to close regulator port 59.

Accordingly, on a fast recycle of the thermostat which controls the energization of the pilot valve solenoid 15, the regulator port 59 is closed in order to provide the slow opening operation for the valve 10 which affords ignition of the main burner on the next cycle, with minimum ignition noise and without rollout.

In the case of leakage past valve seat 40 from the valve inlet 14 to the port 24, or if pilot valve 18 is stuck open, gas flows through passageway 13 and via valve gas tubing 131 to chamber 137 and through outlet 141 to the pilot burner. Gas which accumulates within the pressure chamber 137 creates a pressure on diaphragm 136 which moves the center of the diaphragm towards the right, moving the valve member 145 and thus, valve disc 183, toward the right, to close the valve 144. Since in the absence of a request for heat, the main valve 20 does not operate, the pressure building up in chamber 137 is not equalized by a pressure provided in chamber 139 whenever the main valve 20 is operated to open valve outlet port 32.

Therefore, on the next call for heat, valve port 176 is closed and no gas flows to the pilot burner and the system times out in a manner known in the field of automatic fuel ignition control systems. Alternatively, when an alarm switch, such as switch 195 is provided, operation of the switch 195 in response to push rod 184 interrupts the thermostat circuit and activates a suitable alarm device.

It should be noted that when the system goes to lockout, the pressure in chamber 137 is sealed in, and like a boot-strap, oscillator, valve 144 is locked closed. The only way to reset the system on is to disconnect valve tubing 131 and let the pressure in chamber 137 bleed to the atmosphere. The purpose of this difficult restart is to make it necessary to call in a knowledgeable serviceman in order to reset the system.

If an easy restart is desirable, a manually operated bleed valve (not shown) can be placed in the wall 156 of chamber 137, which when operated vents the chamber 137 to the pilot burner.

An additional safety feature is afforded by the use of safety valve tubing between the valve 10 and the leak detection apparatus 35. Thus, if tubing 131 is disconnected, no gas flows to the pilot burner with subsequent lockout. If gas tube 150 is disconnected, the system goes to lockout since there is no gas supplied to chamber 139.

I claim:

1. In a valve assembly including first valve means operable to permit gas flow through a first port from an inlet to an outlet of said first valve means, and second valve means operable to permit gas flow over a second port from an inlet to an outlet of said second valve means, gas flow control means for controlling gas flow from said outlet of said first valve means to a utilization means, said gas flow control means comprising third valve means having an inlet communicating with said outlet of said first valve means and an outlet communicating with a gas inlet of said utilization means, said third gas valve means being operable to control gas flow over a control port interposed between said inlet and said outlet of said third valve means, said control port being normally open to permit gas flow from said outlet of said first valve means to said inlet of said utilization means, said third valve means including valve actuator means responsive to a control pressure provided in response to operation of said second valve means to maintain said control port open, and said valve actuator means being responsive to a further control pressure provided in response to gas flow over said first port in the absence of gas flow over said second port for a predetermined time to close said control port to thereby prevent gas flow to said utilization means.

2. In a valve assembly including first valve means operable to permit gas flow through a first port from an inlet to an outlet of said first valve means, and second valve means thereafter operable within a predetermined time to permit gas flow over a second port from an inlet to an outlet of said second valve means, a gas flow control means comprising a housing having first and second inner chambers, said first chamber having an inlet communicating with said outlet of said first valve means and an outlet, a control valve having an inlet communicating with said outlet of said first chamber and an outlet, and a valve member disposed to open and close a control port of said control valve which is interposed between said inlet and said outlet of said control valve, and valve actuator means operatively coupled to said valve member for normally maintaining said valve member in a flow-permitting position relative to said control port to permit gas flow through said first chamber from said outlet of said first valve means to said outlet of said control valve whenever said first valve means is operated, said second chamber having an inlet communicating with said outlet of said second valve means to permit gas flow into said second chamber whenever said second valve means is operated, to establish a pressure in said second chamber which operates on said valve actuator means to cause said valve actuator means to maintain said valve member in flow-permitting position relative to said control port, said valve actuator means being responsive to a pressure created within said first chamber in response to the flow of gas through said first chamber and in the absence of a pressure in said second chamber within said predetermined time to move said valve member toward a flow-preventing position relative to said control port, to thereby interrupt gas flow to said outlet of said control valve.

3. A valve assembly as set forth in claim 2 wherein said valve actuator means comprises a pressure diaphragm extending within a central cavity of said housing, dividing said cavity into first and second portions to define said first and second chambers, said valve member being operatively coupled to a center portion of said diaphragm for movement therewith, said center portion of said diaphragm being moved, to carry said valve member toward said flow-preventing position, whenever the pressure in said first chamber exceeds the pressure in said second chamber.

4. A valve assembly as set forth in claim 3 wherein said valve actuator means further includes bias means disposed within said second chamber to apply a force to the center portion of said diaphragm to normally maintain the center portion of said diaphragm at a first position in which said valve member is positioned in said flow-permitting position, said valve member being moved toward said flow-preventing position by said diaphragm in the absence of a pressure in said second chamber whenever the pressure in said first chamber exerts a force on said diaphragm which exceeds the force provided by said bias means.

5. A valve assembly as set forth in claim 2 which includes a switch operated by said valve actuating means upon movement of said valve member to said flow-preventing position to energize an alarm device to indicate that said valve member has been moved to said flow-preventing position.

6. In a valve assembly, the combination comprising a gas valve comprising a first housing including a main body portion having a central passageway interconnecting an inlet and an outlet of said valve, said main body portion having first and second ports formed therein between said inlet and said outlet, a first valve member disposed to normally close said first port, and a second valve member disposed to normally close said second port, said first valve member being operable to open said first port to permit gas flow through said first port from said valve inlet to an inlet of said second port, and said second valve member thereafter being operable within a predetermined time to open said second port to permit gas flow from said first port to said valve outlet over said second port, and a gas flow control means including a second housing having a central cavity, a pressure diaphragm extending within said cavity, dividing said cavity into first and second chambers, said first chamber having an inlet communicating with said first port and an outlet, a control valve having an inlet communicating with said outlet of said first chamber and an outlet, and a third valve member operatively coupled to said diaphragm and movable therewith to open and close a control port which is interposed between said inlet and said outlet of said control valve, and bias means operatively coupled to said diaphragm for applying a force thereto for normally biasing said diaphragm to position said third valve member to a flow-permitting position relative to said control port to permit gas flow through said first chamber from said first port to said outlet of said control valve whenever said first valve is operated, said second chamber having an inlet communicating with said second port to permit gas flow into said second chamber whenever said second valve is operated to establish a pressure in said second chamber which operates on said diaphragm to maintain said third valve member in flow-permitting position relative to said control port, the gas flow through said first chamber creating a pressure which operates upon said diaphragm in the absence of a pressure in said second chamber within said predetermined time to offset the force of said bias means to move said third valve member to a flow-preventing position relative to said control port to thereby interrupt gas flow to said outlet of said control valve.

7. A valve assembly as set forth in claim 6 wherein said second housing includes a first hollow cylindrical member having a base portion and a wall portion extending generally perpendicularly to said base portion and terminating in a peripheral flange portion, and a second hollow cylindrical member having a base portion and a wall portion extending generally perpendicular to said base portion and terminating in a peripheral flange portion, the diaphragm being substantially circular and having a main body portion extending generally parallel to said base portions of said first and second members, and a marginal edge clamped between said flange portions of said first and second members.

8. A valve assembly as set forth in claim 7 wherein said control valve includes a valve seat having a third hollow cylindrical member having a wall portion extending through an aperture in said base portion of said first member with an opening at one end being disposed adjacent said base portion of said first member defining said inlet of said control valve and an opening at the other end defining said control port, said third valve member including a shaft extending axially through said third member and having one end secured to the center of said diaphragm and a valve disc carried by the other end of said shaft and disposed to open and close said control port as a function of movement of the center portion of said diaphragm.

9. A valve assembly as set forth in claim 6 which includes a switch mounted within one of said chambers, said switch having contacts operable to energize an alarm device and an actuator element, said third valve member being disposed to operate said contacts whenever said diaphragm moves said third valve member to said flow-preventing position.

10. A valve assembly as set forth in claim 6 which includes a switch mounted within one of said chambers, said third valve member being disposed to operate said switch whenever said diaphragm moves said third valve member to said flow-preventing position to effect the inhibiting of the operation of said second valve member to thereby maintain said second port closed.

11. In a fuel ignition system including a pilot burner, a main burner apparatus, a first valve operable to permit gas flow from an inlet to an outlet of said first valve, and a second valve thereafter operable within a predetermined time to permit gas flow from an inlet to an outlet of said second valve which is connected to an inlet of said main burner apparatus, a valve leak detection apparatus comprising a housing having first and second inner chambers, said first chamber having an inlet connected to said outlet of said first valve and an outlet, and a control valve having an inlet communicating with said outlet of said first chamber and an outlet connected to an inlet of said pilot burner, said control valve having a valve member disposed to open and close a control port which is interposed between said inlet and said outlet of said control valve, and valve actuator means operatively coupled to said valve member for normally maintaining said valve member in a flow-permitting position relative to said control port to permit gas flow through said first chamber from said outlet of said first valve to said pilot burner and to establish a pressure in said first chamber, said second chamber having an inlet connected to an outlet of said second valve to permit gas flow into said second chamber whenever said second valve is operated to establish a pressure in said second chamber which operates on said valve actuator means to cause said valve actuator means to maintain said valve member in flow-permitting position relative to said control port, and the pressure in said first chamber operating on said valve actuator means in the absence of a pressure in said second chamber within said predetermined time to move said valve member to close said control port to thereby interrupt gas flow to said pilot burner.

12. A system as set forth in claim 11 wherein said valve actuator means comprises a pressure diaphragm extending within a central cavity of said housing dividing said cavity into first and second portions to define said first and second chambers, said valve member being operatively coupled to a center portion of said diaphragm for movement therewith, said center portion of said diaphragm being moved to carry said valve member toward said flow-preventing position whenever the pressure in said first chamber exceeds the pressure in said second chamber.

13. A system as set forth in claim 12 wherein said valve actuator means further includes bias means disposed within said second chamber to apply a force to the center portion of said diaphragm to normally maintain the center portion of said diaphragm at a first position in which said valve member is positioned in said flow-permitting position, said valve member being moved toward said flow-preventing position by said diaphragm in the absence of a pressure in said second chamber whenever the pressure in said first chamber exerts a force on said diaphragm which exceeds the force provided by said bias means.

14. A system as set forth in claim 11 which includes a switch operated by said valve actuating means upon movement of said valve member to said flow-preventing position to energize an alarm device to indicate that said valve member has been moved to said flow-preventing position.

15. A system as set forth in claim 11 which includes a switch operated by said valve actuating means upon movement of said valve member to said flow-preventing position to effect the inhibiting of the operation of said second valve to thereby prevent gas flow to said main burner apparatus.

16. In a fuel ignition system including a pilot burner and a main burner apparatus, a valve assembly comprising in combination a gas valve including a first housing having a main body portion with a central passageway interconnecting an inlet which is connected to a gas source and an outlet which is connected to said main gas burner apparatus, said main body portion having first and second ports formed therein between said inlet and said outlet of gas valve, a first valve member disposed to normally close said first port, a second valve member disposed to normally close said second port, a gas flow control means including a second housing having a central cavity, a pressure diaphragm extending within said cavity dividing said cavity into first and second chambers, said first chamber having an inlet communicating with said first port and an outlet, a control valve having an inlet communicating with said outlet of said first chamber and an outlet connectable to an inlet of said pilot burner and a third valve member operatively connected to said diaphragm to open and close a control port which is interposed between said inlet and said outlet of said control valve, and bias means operatively coupled to said diaphragm for applying a force thereto for normally biasing said diaphragm to position said third valve member to a flow-permitting position relative to said control port to permit gas flow through said first chamber and over said control valve from said first port to said pilot burner whenever said first port is open, said second chamber having an inlet communicating with said second port to permit gas flow into said second chamber whenever said second port is open, said first valve member being operated in response to a request signal to open said first port to permit gas flow through said first chamber and said control valve to said pilot burner for ignition, and said second valve member being operated in response to the ignition of the gas supplied to said pilot burner to open said second port to supply gas to said main burner apparatus for ignition by said pilot flame and to said second chamber to establish a pressure in said second chamber which operates on said diaphragm to maintain said third valve member in flow-permitting position relative to said control port, the gas flow through said first chamber creating a pressure which operates upon said diaphragm in the absence of a pressure in said second chamber for a predetermined time to offset the force of said bias means to move said third valve member to a flow-preventing position relative to said control port to thereby interrupt gas flow to said pilot burner.

* * * * *